E. SOPER.
THILL-COUPLING.
No. 7,106. Reissued May 9, 1876.
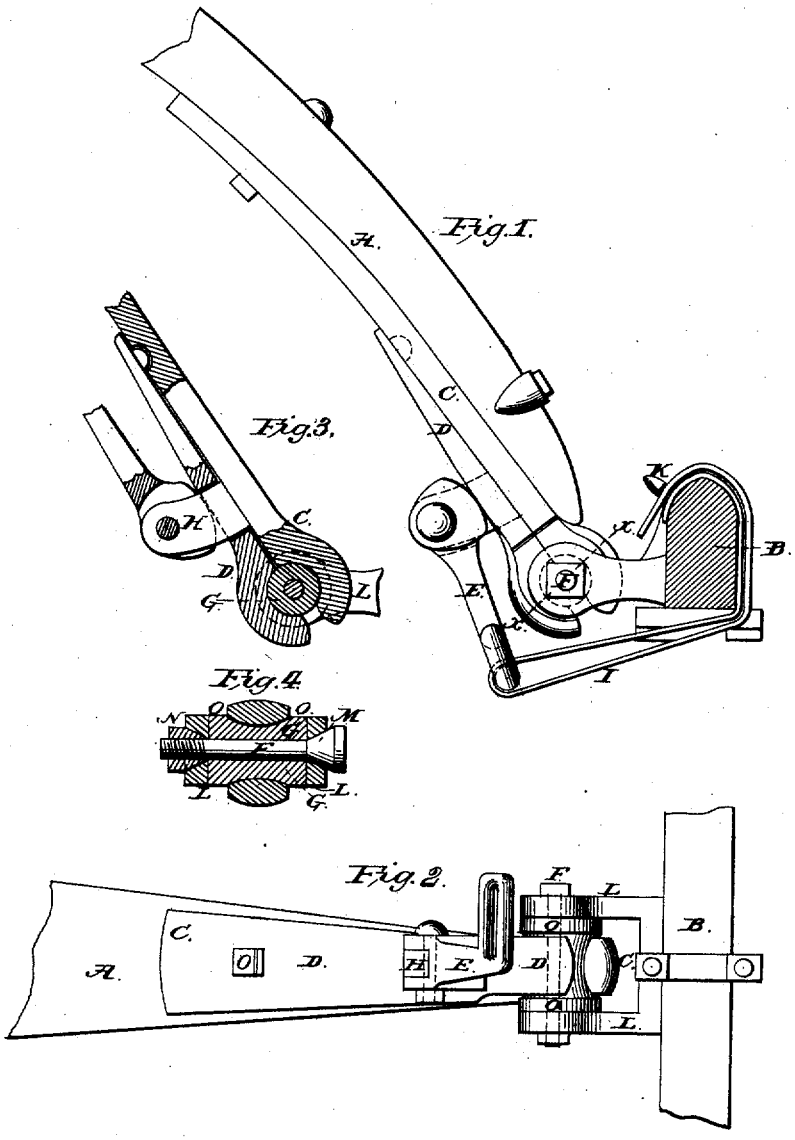
Witnesses:
Colon C. Kennon
Chas. A. Pettit
Inventor:
Ephraim Soper
By Munn & Co
Attorneys.
N. PETERS, PHOTO-LITHOGRAPHER, WASHINGTON, D. C.

UNITED STATES PATENT OFFICE.

EPHRAIM SOPER, OF BROOKLYN, NEW YORK.

IMPROVEMENT IN THILL-COUPLINGS.

Specification forming part of Letters Patent No. 159,615, dated February 9, 1875; reissue No. 7,106, dated May 9, 1876; application filed August 2, 1875.

*To all whom it may concern:*

Be it known that I, EPHRAIM SOPER, of Brooklyn, in the county of Kings and State of New York, have invented a new and Improved Shaft-Coupling for Carriages, of which the following is a specification:

The invention will first be fully described, and then pointed out in the claims.

Figure 1 is a side elevation of the shaft and clip, and a section of the axle. Fig. 2 is a plan view of Fig. 1. Fig. 3 is a view of the clamping apparatus, cushion, and jack-bolt in section. Fig. 4 is a section through the clamp-cushion and jack on the line *x x*, Fig. 1.

Similar letters of reference indicate corresponding parts.

A represents the shaft to be coupled to the axle B. C is one of the eye-strap pieces. D is the other; and E is the cam-lever for fastening them to the jack-bolt F and its cushion G. The part C of the clamp is bolted to the shaft, and it has a stud, H, going through a mortise in the part D, and having the cam-lever E pivoted to it, so as to force the clamp together, and hold it fast. The safety-strap is connected to the cam-lever, as shown, instead of the eye-plate, so that, besides serving the purpose of the strap itself, it prevents the cam from working loose.

I propose to connect the safety-strap to the axle by passing it under the latter, up and over the top to the front portion, and buttoning it on the stud K, instead of buckling it to a loop of the jack, as it is now arranged, for the jack is liable to break in some cases, and release the strap, which cannot be released in such an event when the strap is connected as I propose.

The cushion of elastic material is made with a wide groove in the middle portion, and the eye in the eye-strap clamp is contracted along the middle portion, so that the collars O of the cushion are interposed between the ears and the eye-strap, which is made considerably narrower than the space between the ears L of the jack, and thereby effectually prevented from striking against the ears and rattling.

It is not essential to make the groove in the cushion, for the eye-strap clamp will swell up the ends of the cushion between the clamp and the ears of the jack by pinching the middle portion of the cushion snugly.

M represents the conical portion of the bolt next to the head, and N is the conical extension of the nut, for forcing into corresponding holes in the ears of the jack, to bind the bolt and the nut by friction, so as not to work loose, and also to secure the bolt against rattling.

The coupling is also applicable for coupling side bars to springs.

I am aware that it is not new to use cones in eye-piece separate from bolt and nut, thus allowing the latter readily to work loose; but I employ the cones as wedges.

What I claim is—

1. The combination of a bolt having conical head and a nut of conical shape fitted only in the ears of clip, as and for the purpose described.

2. The combination of clamps C D, cam-lever E, and strap I, as and for the purpose set forth.

3. The combination, with eye-clamp, of a jack-bolt cushion, that forms also a cushion between the eye-clamp and ears of clamp, as and for the purpose specified.

EPHRAIM SOPER.

Witnesses:
T. B. MOSHER,
ALEX. F. ROBERTS.